Oct. 11, 1966     A. G. BOSE     3,278,866
SELECTIVE TRANSMISSION
Filed Oct. 23, 1959     4 Sheets-Sheet 1

*INVENTOR.*
AMAR G. BOSE
BY
Charles Hieken
ATTORNEY

Oct. 11, 1966   A. G. BOSE   3,278,866
SELECTIVE TRANSMISSION
Filed Oct. 23, 1959   4 Sheets-Sheet 3

INVENTOR.
AMAR G. BOSE
BY Charles Hieken
ATTORNEY

INVENTOR.
AMAR G. BOSE
ATTORNEY

United States Patent Office 3,278,866
Patented Oct. 11, 1966

3,278,866
SELECTIVE TRANSMISSION
Amar G. Bose, 642 Los Angeles Ave., Hollywood, Pa.
Filed Oct. 23, 1959, Ser. No. 848,890
34 Claims. (Cl. 333—17)

The present invention relates in general to selective signal transmission and more particularly concerns techniques for appreciably reducing undesired components in an input signal while transmitting the desired components without distortion. An exemplary embodiment of the invention is specifically concerned with effecting a marked reduction in audible record scratch while transmitting the full range of recorded audible frequencies without audible distortion. In a preferred embodiment of the invention, under the worst conditions where the waveform of the noise pulse conforms with that of the desired signal over the duration of the noise pulse, the audible effect of the latter is appreciably reduced without audibly distorting the desired signal. As the difference between the waveform of a noise pulse and that of the desired signal over the duration of the pulse becomes greater, the degree of pulse noise rejection is correspondingly enhanced. Where the desired signal frequencies are in the low or middle range of audio frequencies, noise pulses present in the transduced signal derived from the record are almost completely eliminated without imparting audible distortion to the desired signal components.

The elimination of noise pulses from information bearing signals is a result long sought for by those skilled in the communications art. Various techniques, such as the use of clipping circuits, have been developed for removing static pulses from a received radio signal. However, conventional clipping circuits are not only sensitive to noise peaks, but also to signal peaks. As a result, while the noise pulses in the received output signal are reduced, the clipping of desired signal components introduces undesirable distortion. In the case of speech, the result of this distortion is reduced intelligibility. Where music is being transmitted, the resulting intermodulation and harmonic distortion causes the music to sound unpleasant.

One approach to the problem assumed that most noise pulses contain relatively high frequency spectral components. Again recognizing that noise pulses were most objectionable during soft passages of music, a filter having a variable upper cut-off frequency controlled by the signal level was employed. During loud passages, the filter passed the full range of audio frequencies. During soft passages, the high frequency cut-off was appreciably reduced to lessen noise. This method has two disadvantages. First, the reduced bandwidth filter also attenuates desired signal components. Thus, music from a solo instrument during a soft passage is not reproduced with true fidelity. In addition, a filter whose bandwidth is a time varying function also introduces non-linear distortion as the level of the music passage changes.

Accordingly, it is contemplated as an important object of the present invention to provide a system for effecting an exceptionally high degree of noise pulse reduction while transmitting desired signal components without audible distortion.

It is a more general object of the invention to provide means for selectively transmitting certain components of an input signal.

It is still another object of the invention to achieve the foregoing objects with a circuit employing standard components of relatively low cost.

According to one aspect of the invention, an input signal having the desired and undesired signal components is coupled from an input terminal to an output terminal through means having a nonlinear transfer characteristic. This nonlinear transfer characteristic includes a linear portion. Signal components for transmission without distortion are transferred by the system in accordance with the linear portion of the transfer characteristic while signal components to be modified by the system are transferred in accordance with nonlinear portions of the transfer characteristic.

More specifically, when it is desired to separate music from noise pulses, a limiter is employed which clips the noise pulses riding above the music signal level while transferring all audible frequencies of the music signal to the output terminal without audible distortion.

According to another aspect of the invention, frequency selective means are also employed between the input and output terminal together with coupling means having a nonlinear transfer characteristic including a linear portion. In the absence of noise, the transfer characteristic of the system is essentially linear and its frequency response characteristic substantially uniform over the frequency range including the spectral components of the input signal. Only certain spectral components are allowed to be applied to the nonlinear coupling means with sufficient amplitude to cause it to operate on its nonlinear portion. As specifically applied to separating record scratch from music, the nonlinear coupling means is a limiter and only high frequency signals are allowed to cause the limiter to limit. This is advantageous since most record scratch appears to have only high frequency components.

Another feature of the invention resides in utilizing a predetermined characteristic of the input signal to control the extent of the linear portion without changing its slope. Specifically with reference to eliminating record scratch from music, the music signal amplitude controls the extent of the clipping level so that the latter coincides essentially with the peak amplitude of the music signal. This results in noise pulses never exceeding the signal amplitude of the music while passing all frequencies of the music signal without audible distortion.

In a preferred embodiment of the invention, balanced limiters are employed together with various combinations of frequency selective networks to achieve the desired results. For example, in one embodiment of the invention two frequency selective networks having inverse frequency response characteristics are cascaded with and intercoupled by the nonlinear coupling means.

In another embodiment, one frequency selective network is cascaded with the nonlinear coupling means between the input and output terminals. A second frequency selective network having a frequency response characteristic which is the complement of the first provides a shunt path between input and output terminals.

An important discovery leading to the systems incorporating the inventive concepts concerns the difference between music and noise. The duration of a noise pulse is much shorter than that of a musical tone, and listeners do not object to eliminating the initial portion of the musical tone for a time corresponding to the duration of the noise pulse. It has been found that change in clipping level of the limiter in response to a change in the desired signal level may be delayed for a time interval corresponding approximately to the duration of a noise pulse.

Other features, objects and advantages of the invention will become apparent from the following specification when read in connection with the accompanying drawing in which.

Figure 1:
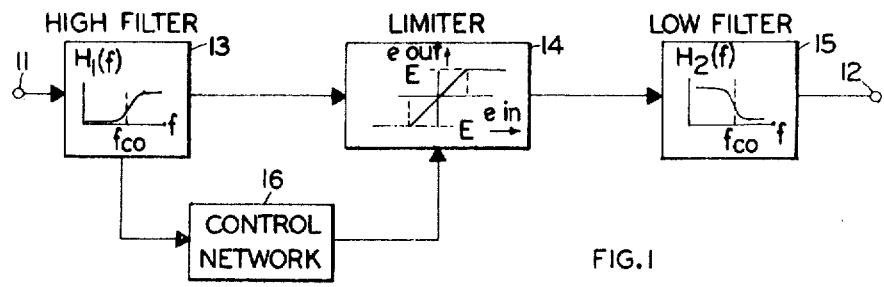
FIG. 1 is a block diagram generally illustrating the logical arrangement of a system according to the invention wherein inverse filters are cascaded with and intercoupled by a limiter.

With reference now to the drawing, and more particularly FIG. 1 thereof, there is illustrated a block diagram generally illustrating the logical arrangement of one system according to the invention. The principles of the invention are best understood by considering the specific problem of removing record scratch from music without audibly distorting the latter. It is, however, to be understood that the invention is not to be limited to the specific apparatus and examples described herein since many of the inventive features are applicable to other situations involving selective signal transmission.

An input signal, which may be derived from a phonograph pick-up and include record scratch noise as well as the desired music signals, is applied to input terminal 11 and the music signal is faithfully reproduced on terminal 12, but with the noise pulses no greater in amplitude than the amplitude of the music signal. The input signal is applied to high filter 13 which imparts considerably more attenuation to the low range of frequencies than to the high range of audio frequencies. Its transfer characteristic as a function of frequency, $H_1(f)$ is pictorially represented. The cut-off frequency, $f_{co}$, is the half-power point of the frequency-sensitive portion of the filter.

The output of high filter 13 is applied to the input of balanced limiter 14 which has a nonlinear transfer characteristic graphically represented including a linear portion which passes through the origin between the limiting levels $+E$ and $-E$. As long as the amplitude of the input signal is less than E, the output of limiter 14 is a faithful reproduction of the signal applied to its input.

The output of limiter 14 is delivered to low filter 15 which imparts more attenuation to the high frequency signals than to low frequency signals. Its transfer characteristic as a function of frequency, $H_2(f)$ is preferably the inverse of $H_1(f)$; that is, $H_1(f)H_2(f)$ is substantially constant independently of frequency. Thus, signals which operate upon the linear portion of the transfer characteristic of limiter 14 are transferred without distortion from terminal 11 to terminal 12.

The output of high filter 13 is also applied to control network 16 which delivers a signal to limiter 14 for maintaining the clipping level E substantially equal to the peak amplitude of the high frequency music signals passed by filter 13.

The preceding discussion of the physical arrangement of the system shown in FIG. 1 should facilitate an understanding of certain principles of the invention. It has been discovered that record scratch noise pulses assume the waveform generally of two small pulses of one polarity separated by a larger pulse of opposite polarity, all three occurring in less than a millisecond. A further discovery is that musical tones persist for much longer than this period. Moreover, the human ear does not appear able to detect a delay in the start of a tone as small as one millisecond. The present invention takes advantage of these discoveries and additionally the known fact that record scratch generally consists of pulses having only high frequency components.

In the embodiment of FIG. 1, the low frequency signal components are attenuated while the high frequency components, including the noise pulses are passed with much larger relative amplitude to the input of the limiter. Thus, if there is a 10,000 cycle tone, the clipping level E of limiter 14 corresponds to the peak amplitude of this tone. If its amplitude is suddenly increased, control network 16 responds by readjusting the clipping level E until it again corresponds to this new level of the tone. However, this readjustment is delayed for approximately a millisecond so that the first few cycles of the tone of the new amplitude are clipped. This clipping occurs for such a short duration that it is not sensed by the human ear.

If the sudden increase in amplitude is due to a noise pulse rather than a change in the desired signal amplitude, both the positive and negative portions of the noise pulse are clipped so that they assume essentially the level of the high frequency tone whose amplitude corresponds to the clipping level of the limiter and the clipping level remains unchanged. Except for the short delay interval of less than a millisecond, all musical tones are transferred by the limiter 14 with a gain corresponding to the constant slope of the linear portion of the transfer characteristic so that no distortion is introduced. It is preferred in this embodiment that the clipping be symmetrical to prevent generating undesired subharmonics. Such undersired subharmonics may be introduced if the clipped noise pulse has a nonzero average value over its duration. In addition, undesired higher order harmonics are attenuated by the low filter 15.

The output of the limiter 14, therefore, includes clipped noise pulses and desired high frequency tones together with the attenuated low frequency signals. This output signal is applied to the input of low filter 15 which further attenuates the clipped noise pulses while attenuating the high frequency tones relative to the low frequency tones so that the original balance of musical tones present in the recorded music is restored at output terminal 12.

Figure 2:
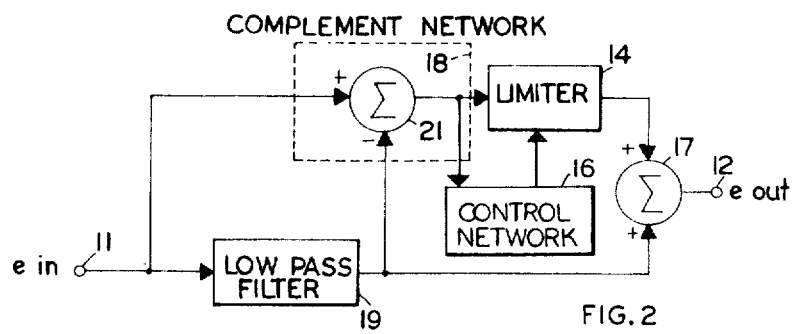
FIGS. 2 and 3 are block diagrams generally illustrating the logical arrangement of other embodiments of the invention in which a pair of networks having complementary characteristics are employed.

Similar results can be achieved by utilizing what is termed a complementary system in which two parallel paths are provided between input terminal 11 and output terminal 12 as shown in FIG. 2. One parallel path is provided by low pass filter 19 in series with adding network 17 between terminals 11 and 12. A second parallel path is provided by the complement network 18 in series with the limiter 14 and the summing network 17.

Network 18 co-operates with low pass filter 19 to effectively form a high pass filter having a frequency response characteristic which additively combines with the frequency response characteristic of low pass filter 15 to provide a transfer characteristic between terminals 11 and 12 with a substantially uniform frequency response when limiter 14 is operating upon its linear portion.

The novel techniques for obtaining the complementary characteristics of network 18 are especially advantageous since the frequency response characteristic of low pass filter 15 determines the characteristics of the output of network 18 to insure nearly perfect complementation. This is accomplished by differentially combining the output of low pass filter 15 with its input signal and suitably adjusting the gain in the adding network 21. As a result, the input signal to limiter 14 includes the noise impulses and high frequency tones as described above in connection with the system of FIG. 1.

The outputs of limiter 14 and low pass filter 15 are cumulatively combined in adding network 17 which provides the undistorted music signal on terminal 12 with noise pulses appreciably reduced.

Figure 3:
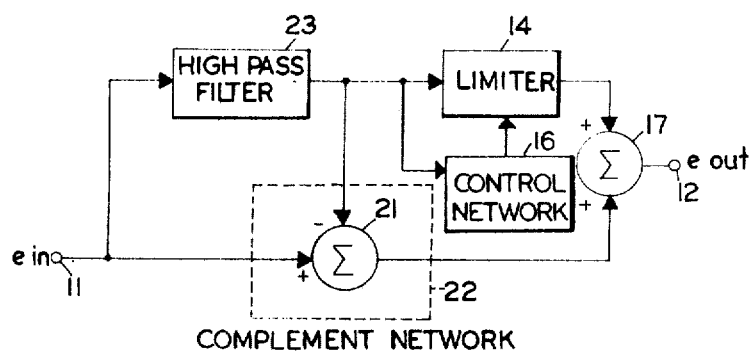

Referring to FIG. 3, there is shown still another complementary system wherein the frequency response characteristics of the high pass filter 23 determine those of its complement formed by network 22 co-operating with filter 23 to provide a low pass characteristic. High pass filter 23 receives the input signal on terminal 11 and delivers the pulse noise and high frequency tone components to the input of limiter 14. Adding network 21 differentially combines the input and output to high pass filter 23 so that the output delivered to adding network 17 is effectively the input signal applied to terminal 11 altered in accordance with a frequency response characteristic which is the complement of that of high pass filter 23.

The complementary system has certain advantages over the cascaded system of FIG. 1 in that when there are no high frequency musical components, the clipping level of limiter 14 is essentially zero so that the signal reproduced on output terminal 12 is almost completely free of the noise impulse.

Having discussed the relationship between the different elements of the several systems, it is appropriate to consider some representative forms of the system elements.

Figure 4:
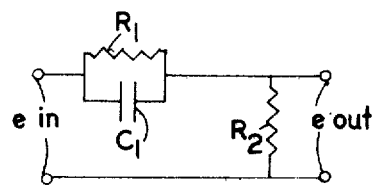
FIG. 4 is a schematic circuit diagram of a suitable embodiment of high filter 13 of FIG. 1.

Referring to FIG. 4, there is shown a schematic circuit diagram of an RC stage having the frequency response characteristics of high filter 13. The critical frequencies are graphically represented in the complex frequency or S-plane in FIG. 5.

The frequency response characteristic $H_1(f)$ is equal to the ratio of the output voltage to the input voltage and given by:

$$\frac{s + \frac{1}{R_1 C_1}}{s + \frac{R_1 + R_2}{R_1 R_2 C_1}}$$

where $s = j2\pi f$

For low frequencies, $H_1 = R_2/R_1 + R_2$. At high frequencies, $H_1$ is unity. To increase the rate of transition, it is preferable to cascade several identical stages. If the low frequency gain per stage is made equal to 2/7, corresponding to the ratio of the zero position to the pole position, three cascaded stages yield a total attenuation of about 31 db. With this ratio and the parameter values chosen so that the pole is 5,000 cycles to the left of the origin in the S-plane, the half-power point occurs at approximately 5,000 cycles. These stages may be inserted as the intercoupling network between stages of amplification.

Figure 5:
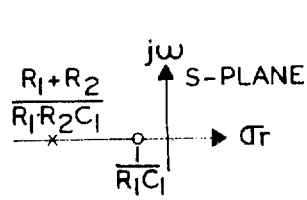
FIG. 5 shows the distribution of critical frequencies in the complex plane for the voltage transfer ratio of the circuit of FIG. 4.
Figure 6:
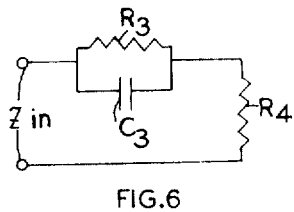
FIG. 6 is a schematic circuit diagram of a network having a driving point impedance functionally related to frequency corresponding to the characteristic of low filter 15 of FIG. 1.
Figure 7:
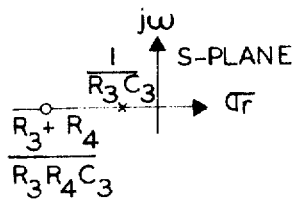
FIG. 7 shows the distribution of critical frequencies in the complex plane for the driving point impedance of the circuit of FIG. 6.

Referring to FIG. 6, there is shown a schematic circuit diagram of a driving point impedance having a pole-zero pattern corresponding to the inverse of the pole-zero pattern represented in FIG. 5. This inverse pattern is shown in FIG. 7. By energizing this driving point impedance with an effective current source, the ratio of voltage developed thereacross to the applied current exhibits a frequency response characteristic inversely related to that of the network of FIG. 4. To obtain a filter having an overall response which is the inverse of the filter of FIG. 6, three stages are used in which the high frequency gain $R_3/R_3+R_4=2/7$, corresponding to the ratio of the pole position to the zero position, and the zero in FIG. 7 is located 5,000 cycles to the left of the origin in the S-plane.

Figure 8:
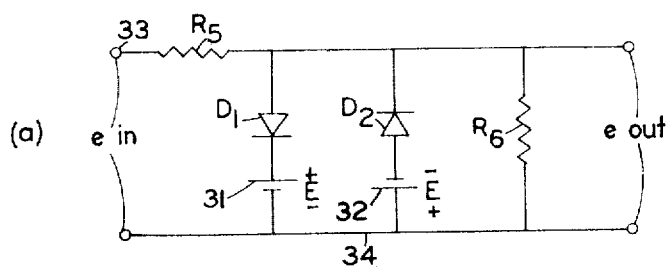
FIG. 8 is a schematic circuit diagram of a suitable balanced limiter having the characteristic shown in FIG. 5.
Figure 9:
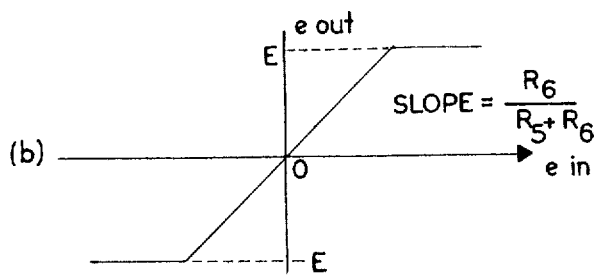
FIG. 9 is a graphical representation of the transfer characteristic of the limiter of FIG. 8.

Referring to FIG. 8, there is shown a schematic circuit diagram of a suitable embodiment of limiter 14 in which the biasing levels of magnitude E established by the batteries 31 and 32 determine the clipping level of a signal applied between input terminal 33 and the common bus 34. Many advantages of the invention can be achieved with essentially the circuit of FIG. 8 in which batteries are actually employed to determine the clipping levels. This circuit includes a diode $D_1$ in series with an input resistance $R_5$ and battery 31, the latter battery normally biasing diode $D_1$ to be normally nonconductive. Diode $D_2$, in series with battery 32, is also connected in series with resistor $R_5$ and biased to be normally nonconductive. Resistor $R_6$ is connected between resistor $R_5$ and the common terminal 34. Resistors $R_5$ and $R_6$ determine the constant ratio of output voltage to input voltage when diodes $D_1$ and $D_2$ are not conducting. This condition exists whenever the input signal amplitude is less than E. If this amplitude is exceeded by the input signal, the output signal amplitude is E, its polarity being the same as that of the input signal. This non-linear transfer characteristic is shown in FIG. 9.

If the diodes were ideal, the break point would be sharp and perfect limiting would be obtained. In a circuit using practical diodes, the break point is slightly rounded and limiting is not perfect because the forward diode conductivity is finite. These effects are considerably reduced by amplifying the input signal before applying it to terminal 33 and correspondingly increasing the clipping level E.

In a preferred embodiment of the invention, the clipping level E is a function of the input signal level. It is advantageous to develop the biasing level for the clipping diodes from the high gain amplifier which delivers the input signal to terminal 33. Noise is clipped without audibly distorting music by maintaining the bias level unchanged in response to high frequency pulse noise while altering the bias level to follow a sustained new level of a musical tone. In a representative embodiment of the invention the bias level remains unchanged for approximately the duration of a noise pulse, but changes rapidly thereafter to follow a new amplitude level which is sustained.

Figure 10:
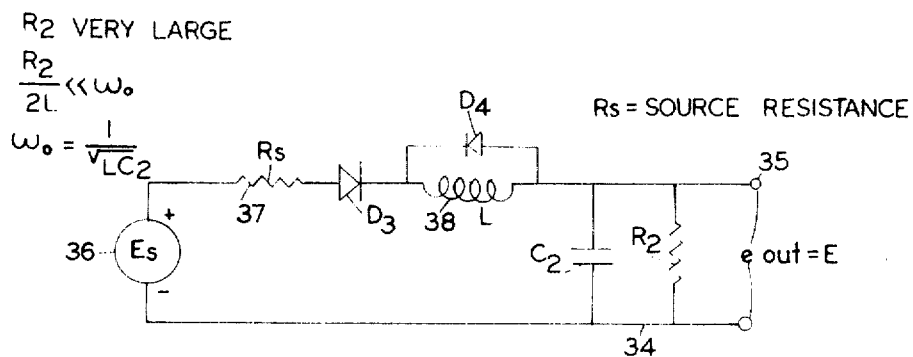
FIG. 10 is a schematic circuit diagram of a preferred means for providing the bias E which determines the clipping level of the limiter of FIG. 8.
Figure 11:
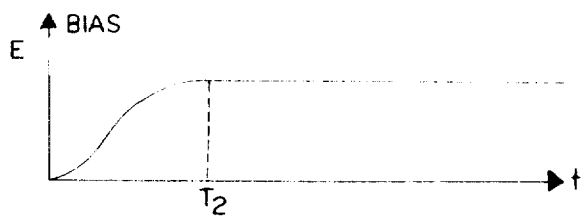
FIG. 11 is a graphical representation of the response of the circuit of FIG. 10 to a step function supplied by the input voltage source.

Referring to FIG. 10, there is shown a schematic circuit diagram of an embodiment of the invention for adjusting the biasing level in this manner. The bias level is provided between common bus 34 and output terminal 35 in response to the signal amplitude level provided by voltage source 36 which may be a cathode follower energized by the same amplifier which amplifies the high frequency signal components. The voltage source 36 is in series with a series resistance 37, a diode $D_3$, an inductor 38 shunted by a diode $D_4$ poled oppositely to diode $D_3$ and the shunt combination of capacitor $C_2$ and resistor $R_2$. The response of this circuit to a step function is graphically represented as a function of time in FIG. 11.

The reason for this response will be better understood from the following considerations. With diode $D_3$ closed and diode $D_4$ open, the output voltage at terminal 35 in response to a step function applied from source 36 is as follows for the indicated time intervals:

$$E = \begin{cases} \frac{1-1/3 \cos \omega t}{3} & 0 < t < \frac{\pi}{\omega_0} \\ 1 & t > \frac{\pi}{\omega_0} \end{cases}$$

If the step function input were removed before the output voltage reached its final value, the current in the inductor 38 would be non-zero and develop a counter e.m.f. tending to oppose a change in current and continue to raise the output potential on terminal 35. Diode $D_4$ prevents this because such counter e.m.f. closes this diode, and the latter acceps the current flowing in inductor 38, the potential on terminal 35 remaining unchanged.

Referring again to FIG. 11, the step function response has zero slope at the origin, rises slowly initially and increases very rapidly until it levels off near its maximum value. When the input signal from source 36 is removed, the bias potential on terminal 35 decays exponentially with a time constant equal to the product $R_2C_2$. When source 36 delivers an information signal, the bias level E corresponds to the peak amplitude of the signal delivered by the latter.

In selecting values for the resistances, inductors and capacitors in the circuit of FIG. 10, properties of noise and music are considered. It is desirable to introduce as long a delay as possible consistent with avoiding audible clipping of the music tones. Experimentally it was found that with a build-up time of 1.5 milliseconds, clipping of the initial portion of a musical tone burst was inaudible.

Preferably, $R_2$ is large and $R_s/2L$ is much smaller than $1/LC$ to achieve high Q. Since musical tones are frequently characterized by a rapid succession of rises and falls in amplitude, and the bias voltage on terminal 35 decays between rises, it has been found desirable to maintain the potential on terminal 35 relatively constant during such signal fluctuations to prevent excessive clipping. This is accomplished if the decay time constant is relatively long. A suitable value for the time constant $R_2C_2$ was found to be approximately 37 milliseconds.

Some practical satisfactory values were $R_2 = 110,000$ ohms, $C_2 = 0.25$ microfarads, inductor $38 = 1.0$ henry and $R_s = 4,000$ ohms. The circuit is preferably energized by a low impedance source, such as a cathode follower.

Figure 12:
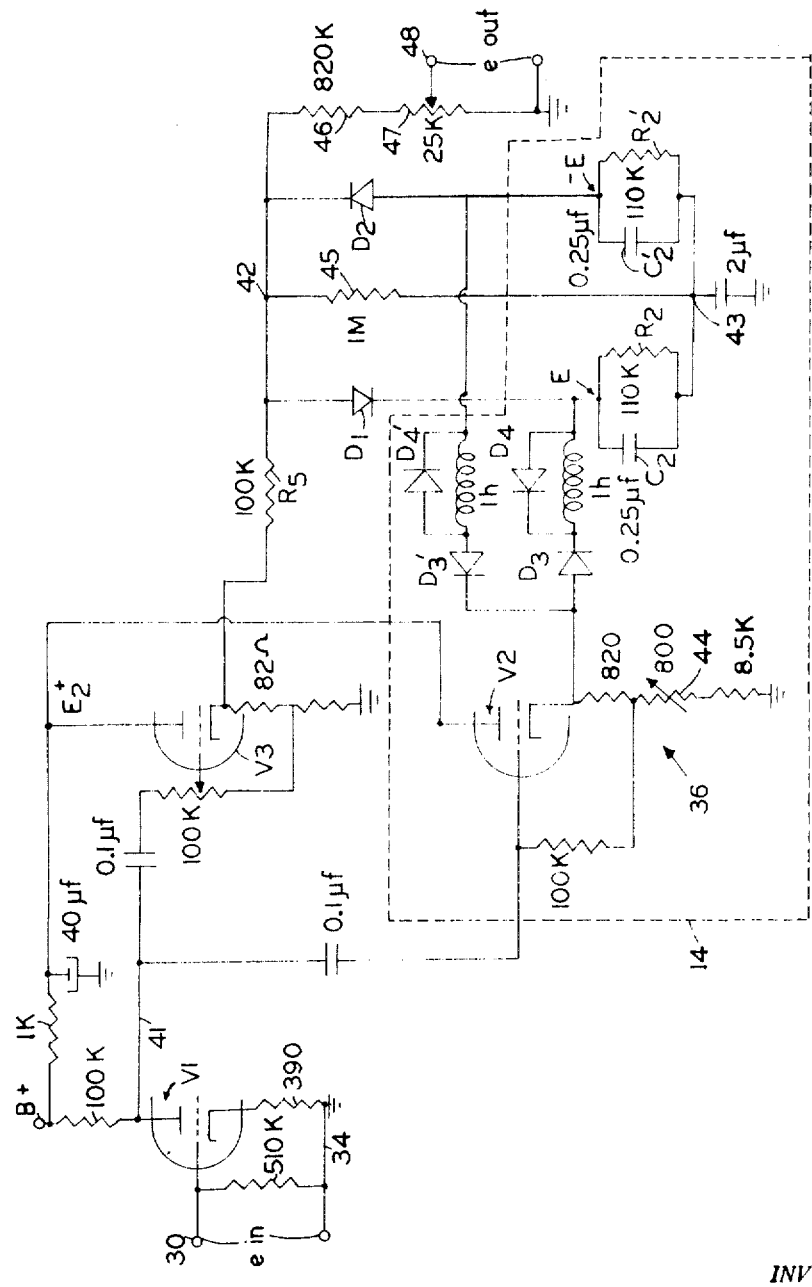
FIG. 12 is a schematic circuit diagram of an exemplary embodiment of the entire balanced limiter together with the means for establishing the controlled bias level.

Referring to FIG. 12, there is shown a schematic circuit diagram of a balanced limiter and control system including the means for automatically controlling the bias E which determines the clipping level of the limiter circuit. Those circuit elements previously described are identified by the same reference symbols in FIG. 12. Since a second circuit like that shown in FIG. 10 is utilized to establish a negative biasing or clipping level, elements for use in establishing that negative level are identified by appending a prime to the reference symbol identifying a corresponding element in FIG. 10.

Representative parameter values are set forth in the circuit diagram. Tube $V_1$ and associated components comprise an amplifier which delivers the amplified high frequency components to line 41. Tubes $V_2$ and $V_3$ and associated components comprise respective cathode followers. The signal path through tube $V_2$ energizes the level setting circuits for establishing the potentials of E and —E on the indicated junctions. Operation of the level setting circuits was discussed above in connection with the description of FIGS. 10 and 11.

By using direct coupling between the cathode follower including tube $V_2$ and the level setting circuits, the effective time constant is sufficiently long to enable the level setting circuits to follow slow variations in signal amplitudes. But the latter cathode follower introduces a D.-C. level.

It has been discovered that unsymmetrical limiting causes distortion and may be introduced if D.-C. levels or not optimized. It was found that by maintaining junctions 42 and 43 at the same D.-C. potential, distortion was avoided. The direct coupling between the cathode of tube $V_3$ and junction 42 by resistor $R_5$ establishes one of these potentials and the potential on capacitor 43 the other. Potentiometer 44 is adjusted until the difference in potential between junctions 42 and 43 is substantially zero.

Resistor 45 shunted by the series combination of resistor 46 and potentiometer 47 form the resistance $R_s$ shown in FIG. 10. Output terminal 48 is connected to the arm of potentiometer 47 for regulating the output amplitude of the undistorted music signal with noise components appreciably reduced.

This specific circuit may be used in any of the systems shown in FIGS. 1–3. In addition, the entire signal may be applied directly to terminal 30 without using any frequency selective filters and still provide a considerable reduction in audible record scratch.

Listening tests demonstrate that the invention considerably reduces record scratch without audibly distorting music. This will be better appreciated by considering test results shown by the oscillographs in FIGS. 13–15. In making these tests, record scratch noise was simulated by providing a single sinusoidal cycle. This was accomplished by rendering a tube having a parallel resonant circuit in its cathode circuit nonconductive for a time interval substantially equal to the reciprocal of the resonant frequency of the tuned circuit.

Figure 13:
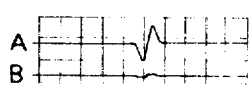
FIGS. 13–15 are oscillographs from a dual trace oscilloscope showing the system output as the lower trace in response to an applied input signal including a noise pulse shown as the upper trace.

Referring to FIG. 13, there is illustrated actual waveforms reproduced from a dual trace cathode ray oscilloscope with the vertical sensitivity adjusted to 0.2 volt/centimeter and the sweep duration adjusted so that the horizontal distance represents 200 microseconds/centimeter. FIG. 13A shows the input signal applied to terminal 11 of the complement system shown in FIG. 2 while FIG. 13B shows the output signal delivered to terminal 12.

Figure 14:

Referring to FIG. 14, the same sweep durations and vertical sensitivity are employed but the noise pulse is shown in FIG. 14A superimposed upon a 10 kc. sine wave of considerably smaller amplitude; yet, in the output signal delivered on terminal 12 (FIG. 14B) the noise pulse amplitude is essentially the same as that of the sine wave.

Figure 15:
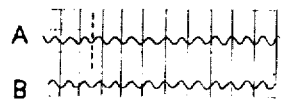

Referring to FIG. 15, there is shown a comparison of the signal delivered to output terminal 12 in response to a signal applied on input terminal 11 for the cascade system of the type shown in FIG. 1. The vertical sensitivity is the same as above but the sweep duration is increased so that the horizontal distance corresponds to two milliseconds/centimeter. FIG. 15A shows the noise pulse superimposed upon a 400 c.p.s. sine wave and FIG. 15B shows the output signal delivered on terminal 12 which shows the almost complete absence of the noise pulse.

There has been described novel selective signal transmission techniques for altering the characteristics of an input signal in a desired manner. The advantages of the invention in connection with reducing record scratch and the different embodiments shown and described are by way of example for illustrating the best mode now contemplated for practicing the invention. The broad principles of the invention have numerous applications where it is desired to selectively alter the characteristics of an input signal. Since those skilled in the art may now make numerous modifications of and departures from the specific embodiments and techniques described herein without departing from the inventive concepts, the invention is to be construed as limited only by the spirit and scope of the appended claims.

What is claimed is:

1. Selective transmission apparatus comprising, an input terminal, an output terminal, means including a pair of unilaterally conducting devices coupled between said terminals having a nonlinear transfer characteristic including a linear portion, a frequency selective network coupling said input terminal to the latter means, means independent of said pair of unilaterally conducting devices for deriving a control signal at its output related to a predetermined characteristic of a signal applied to said input terminal, means coupling the last-mentioned means output to the first-mentioned means to control the bias of said pair of unilaterally conducting devices and thereby control the extent of said linear portion, the slope of said linear portion remaining substantially constant, and a second frequency selective network coupling said means with a nonlinear transfer characteristic to said output terminal.

2. Selective transmission apparatus in accordance with claim 1 wherein the frequency response characteristics of said frequency selective networks differ but the product of said response characteristics is substantially independent of frequency over a frequency spectrum including the spectral components of desired portions of a signal applied to said input terminal.

3. Apparatus for selectively transferring an input signal to an output terminal and attenuating noise impulses each of which occur in a first time interval that is shorter than a second time interval corresponding to the shortest duration of a desired signal comprising, a limiter having a linear transfer characteristic of substantially constant slope over an amplitude range below its limiting level, and control means responsive to a sustained increase in said input signal amplitude for selectively establishing said level at a new value sufficient to effect a linear transfer of said signal to said output terminal during said second time interval following said first shorter time interval less than the duration of said sustained increase in which said input signal is clipped.

4. Selective transmission apparatus comprising, an input terminal, an output terminal, a limiter coupled between said terminals having a linear transfer characteristic of substantially constant slope over an amplitude range below its limiting level, a first frequency selective network coupling said input terminal to said limiter, a second frequency selective network coupling said limiter to said output terminal, means for deriving a control signal at its output related to the amplitude of a signal applied to said input terminal, the latter means responding to increases in said amplitude faster than it responds to decreases in said amplitude, and means for coupling the last-mentioned means output to said limiter to cnotrol said limiting level, whereby said level is increased faster than it is decreased.

5. Selective transmission apparatus in accordance with claim 4 wherein the frequency response characteristics of said frequency selective networks differ but the product of said response characteristics is substantially independent of frequency over a frequency spectrum including the spectral components of desired portions of a signal applied to said input terminal.

6. Selective transmission apparatus in accordance with claim 4 wherein the path between said input and output terminals through said second network being characterized by a linear transfer characteristic.

7. Selective transmission apparatus in accordance with claim 6 wherein the frequency response characteristics of said frequency selective networks differ but the sum of said response characteristics is substantially independent of frequency over a frequency spectrum including the spectral components of desired portions of a signal applied to said input terminal.

8. Apparatus for removing noise pulse energy of relatively short duration from an input signal comprising, means responsive to the amplitude of said input signal exceeding a prescribed limiting level for limiting said input signal and providing a limited output signal of peak amplitude corresponding substantially to said prescribed limiting level for a period approximately equal to said short duration, and means responsive to the amplitude of said input signal continuing to exceed said level after said period for then ending the limiting of said input signal and transferring said signal to an output terminal without distortion for at least a time interval much longer than said short duration.

9. Apparatus for removing noise pulse energy of relatively short duration from an input signal comprising, means responsive to the amplitude of said input signal exceeding a prescribed limiting level for limiting said input signal and providing a limited output signal of peak amplitude corresponding substantially to said prescribed limiting level for a period approximately equal to said short duration, the latter means transferring an input signal with amplitude below said limiting level without distortion means responsive to the amplitude of said input signal continuing to exceed said level after said period for increasing said prescribed limiting level until it corresponds substantially to that of said amplitude, and means for maintaining said limiting level at least equal to the latter amplitude for at least a time interval much longer than said short duration.

10. Apparatus in accordance with claim 9 wherein said means for limiting is characterized by a linear transfer characteristic when the amplitude of said input signal is less than said prescribed limiting level.

11. Apparatus in accordance with claim 9 wherein said means for limiting limits both positive and negative peaks of said input signal which exceed said prescribed level.

12. Apparatus in accordance with claim 11 wherein said means for limiting is characterized by a linear transfer characteristic when the amplitude of said input signal is less than said prescribed limiting level.

13. Apparatus in accordance with claim 9 wherein said means for limiting includes delay means comprising, a first unilaterally conductive device in series with an inductor and a capacitor, a second unilaterally conducting device connected across said inductor with one of its electrodes connected to a like electrode of said first unilaterally conducting device, and means for coupling said input signal to said first device to provide said prescribed level across said capacitor.

14. Apparatus in accordance with claim 13 and further comprising, a resistor connected across said capacitor, the period of the frequency at which the circuit formed by said inductor and capacitor is resonant being approximately twice said short duration, the time constant of said resistor with said inductor being much less than said duration, the time constant of said resistor with said capacitor being much longer than said duration.

15. Apparatus in accordance with claim 11 wherein said means for limiting includes, a pair of delay means, each delay means comprising, a first unilaterally conducting device in series with an inductor and a capacitor, a second unilaterally conducting device connected across said inductor with one of its electrodes connected to a like electrode of said first unilaterally conducting device, and means for coupling said input signal to each first device to provide a pair of potentials equal in magnitude to said prescribed level but of opposite polarity.

16. Apparatus in accordance with claim 15 wherein each of said delay means further comprises, a resistor connected across said capacitor, the period of the frequency at which the circuit formed by said inductor and said capacitor is resonant being approximately twice said short duration, the time constant of said resistor with said inductor being much less than said duration, the time constant of said resistor with said capacitor being much longer than said duration.

17. Apparatus in accordance with claim 16 and further comprising, a first junction, means for coupling said input signal to said first junction, the networks formed by said capacitor shunted by said resistor being connected in series together at a second junction, a pair of oppositely poled unilaterally conducting devices connected from said first junction to respective ones of said delay means at the junction between said capacitor and said inductor.

18. Apparatus in accordance with claim 17 and further comprising, means for maintaining the difference in D.-C. potentials between said first and second junctions substantially zero.

19. Apparatus in accordance with claim 18 and further comprising, a series resistor for coupling said input signal to said first junction, and a shunt resistor larger than said series resistor connected between said first and second junctions.

20. Apparatus in accordance with claim 19 and further comprising, at least two frequency selective networks co-operating with said means for limiting so that the frequency response characteristic of said apparatus is substantially uniform to desired components of said input signal.

21. Apparatus for providing a delayed signal level comprising, a first unilaterally conductive device in series with an inductor and a capacitor, and a second unilaterally conducting device connected across said inductor with one of its electrodes connected to a like electrode of said first unilaterally conducting device.

22. Apparatus in accordance with claim 21 and further comprising, a resistor connected across said capacitor, the time constant of said resistor with said inductor being much less than the period of the frequency at which the circuit formed by said inductor with said capacitor is resonant, the time constant of said resistor with said capacitor being much longer than said period.

23. A circuit having a nonlinear transfer characteristic with a linear portion between first and second levels of opposite sense with respect to a reference level, comprising, a first junction, a second junction maintained at said reference level, sources of said first and second levels, an input terminal, a series resistor connected between said input terminal and said first junction, a shunt resistor connected between said first junction and said second junction, and first and second oppositely poled unilaterally conducting devices connected from said first junction to said first level source and said second level source respectively, each of said level sources including at least another unilaterally conducting device responsive to the signal amplitude on said input terminal for providing said levels proportional in magnitude to said signal amplitude.

24. Selective transmission apparatus comprising, a high filter having a greater response at high frequencies than low frequencies, a balanced limiter energized by the output of said high filter for limiting signals whose amplitude is greater than the magnitude of positive and negative limiting levels of the same magnitude and transferring signals of lesser amplitude to its output without distortion, a control network responsive to said high filter output for establishing said limiting levels in accordance with the amplitude of said high filter output signal amplitude, and a low filter energized by the output of said balanced limiter, the product of the frequency response characteristic of said low filter with that of said high filter being substantially independent of frequency.

25. Selective transmission apparatus comprising, an input terminal, an output terminal, a filter for transmitting spectral components on one side of a predetermined cutoff frequency having its input connected to said input terminal, means for differentially combining the output of said filter with signals applied to said input terminal to provide a complementary filter for transmitting spectral components on the other side of said predetermined cutoff frequency, a balanced limiter energized by spectral components above said cutoff frequency provided by one of said filters for limiting signals whose amplitude is greater than the magnitude of positive and negative limiting levels of the same magnitude and transferring signals of lesser amplitude to its output without distortion, a control network responsive to the output of said one filter for establishing said limiting levels in accordance with said one filter output signal amplitude, and means for cumulatively combining the output of the other of said filters with the output of said balanced limiter to provide a system output signal on said output terminal.

26. Apparatus in accordance with claim 25 wherein said first-mentioned filter is a low pass filter.

27. Apparatus in accordance with claim 25 wherein said first-mentioned filter is a high pass filter.

28. Apparatus in accordance with claim 4 wherein said limiter is a balanced limiter.

29. Selective transmission apparatus in accordance with claim 28 and further comprising, a frequency selective network coupling said input terminal to said balanced limiter and a second frequency selective network coupling said balanced limiter to said input terminal.

30. Selective transmission apparatus in accordance with claim 29 wherein the frequency response characteristics of said frequency selective networks differ but the product of said response characteristics is substantially independent of frequency over a frequency spectrum including the spectral components of desired portions of a signal applied to said input terminal.

31. Selective transmission apparatus in accordance with claim 28 and further comprising, a first frequency selective network coupling said input terminal to said balanced limiter, and a second frequency selective network coupling said input terminal to said output terminal, the path between said input and output terminals through said second network being characterized by a linear transfer characteristic.

32. Selective transmission apparatus in accordance with claim 31 wherein the frequency response characteristics of said first and second frequency selective networks differ but the sum of said response characteristics is substantially independent of frequency over a frequency spectrum including the spectral components of desired portions of a signal applied to said input terminal.

33. A nonlinear filter comprising, an input terminal, an output terminal, means having a controllable transfer characteristic intercoupling said input and output terminals, control means responsive to a predetermined characteristic of a signal applied to said input terminal for controlling said transfer characteristic to assume at least an original characteristic and an altered characteristic, said control means including means responsive to said predetermined characteristic changing from an original value to and maintaining a new value for at least a first time interval for altering said transfer characteristic from said original characteristic to said altered characteristic, means for maintaining said original characteristic during said first time interval, and means for maintaining said altered characteristic for at least a second time interval in which said signal is transferred in accordance with a linear portion of said transfer characteristic different from said first time interval in response to a change from said view value toward said original value.

34. A nonlinear filter in accordance with claim 33 wherein said predetermined characteristic is amplitude, said new value is greater than said original value, and said second time interval is longer than said first time interval.

References Cited by the Examiner
UNITED STATES PATENTS

| | | | |
|---|---|---|---|
| 2,144,995 | 1/1939 | Pulvari-Pulvermacher | 328—171 |
| 2,171,671 | 9/1939 | Percival | 333—18 |
| 2,173,925 | 9/1939 | Tuxen | 333—18 |
| 2,293,835 | 8/1942 | Landon | 323—24 |
| 2,760,011 | 8/1956 | Berry | 333—75 |
| 2,931,901 | 4/1960 | Markusen | 328—171 |
| 3,109,991 | 11/1963 | Ocko | 332—18 |

HERMAN KARL SAALBACH, *Primary Examiner.*

BENNETT G. MILLER, ELI SAX, *Examiners.*

A. J. ENGLERT, G. TABAK, R. F. HUNT,
*Assistant Examiners.*